United States Patent [19]

Moulin

[11] 4,265,110
[45] May 5, 1981

[54] DOWNHOLE CABLE TENSION MEASURING APPARATUS

[75] Inventor: Pierre A. Moulin, Chaville, France

[73] Assignee: Schlumberger Technology Corp., Houston, Tex.

[21] Appl. No.: 51,472

[22] Filed: Jun. 25, 1979

[30] Foreign Application Priority Data

Jun. 30, 1978 [FR] France ................ 78 19585

[51] Int. Cl.³ ........................................... E21B 47/00
[52] U.S. Cl. ........................................ 73/151; 73/1 B
[58] Field of Search ................ 340/860; 73/151, 1 B, 73/141 A, 143

[56] References Cited

U.S. PATENT DOCUMENTS

| | | | |
|---|---|---|---|
| 3,004,427 | 10/1961 | Berry | 73/151 |
| 3,084,297 | 4/1963 | Glerum | 73/141 A X |
| 3,153,339 | 10/1964 | Alexander | 73/151 |
| 3,402,601 | 9/1968 | Heineman | 73/143 |
| 3,490,149 | 1/1970 | Bowers | 33/133 |
| 3,497,958 | 3/1970 | Gollwitzer | 33/133 |
| 3,942,373 | 3/1976 | Rogers | 73/151 |
| 4,054,049 | 10/1977 | Egger | 73/16 |

FOREIGN PATENT DOCUMENTS

796225  6/1958  United Kingdom .

*Primary Examiner*—Jerry W. Myracle

[57] ABSTRACT

Downhole cable tension measuring apparatus according to the invention is connected between a cable and well-logging apparatus suspended from the cable in a borehole. A rod is placed between the cable and the well-logging apparatus so as to elongate elastically under the effect of cable tension. A sleeve, fixed at one end of the rod, surrounds the rod. A transformer, the primary of which is wound on the rod, the secondary of which is wound on the sleeve, detects the relative longitudinal displacement of the other end of the rod with respect to the sleeve. Two primary windings displaced on the rod are alternately excited to generate two signals in the secondary coil in order to correct temperature drifts of the circuits. The rod and sleeve are made of the same metal so that each of them will elongate similarly as a function of temperature. The apparatus is placed in a pressure-balanced oil-filled chamber.

9 Claims, 5 Drawing Figures

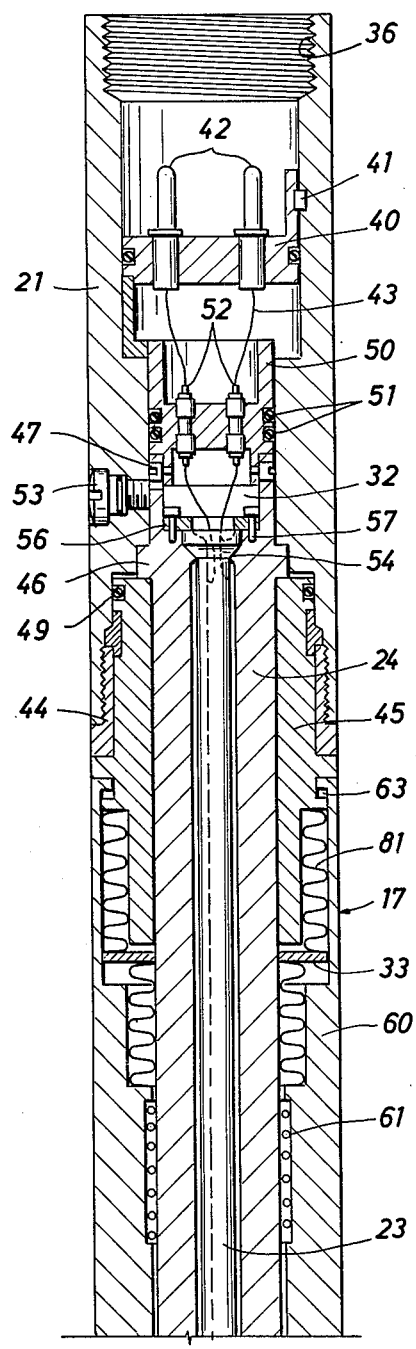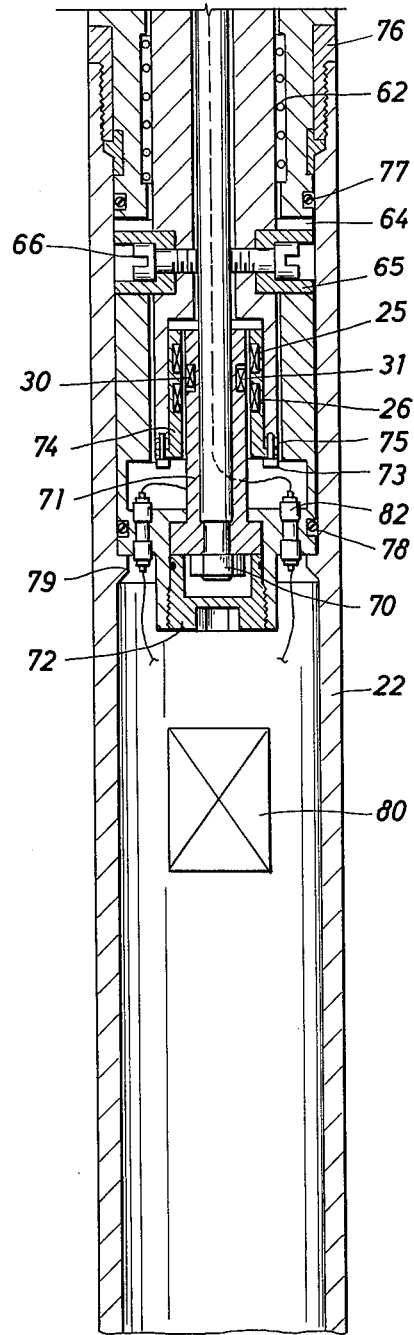
FIG. 3A
FIG. 3B

DOWNHOLE CABLE TENSION MEASURING APPARATUS

BACKGROUND OF THE INVENTION

This invention relates to apparatus for measuring the downhole tension applied to a cable supporting a well-logging apparatus in a borehole.

To accurately determine the depth of a well-logging tool suspended at the end of a cable in a borehole, it is necessary to measure the displacement of the cable on the surface and to correct the surface displacement measured by the calculated elongation of the cable. The elongation calculation requires information of the surface and downhole tensions applied to the cable. As a first approximation, it is possible to take, as the downhole tension, the apparent weight of the apparatus in the column of drilling mud. However, for apparatus equipped with pads or centering tools, or for directionally deviated wells, the downhole tension depends greatly upon the friction of the apparatus against the borehole wall. It is desirable to measure downhole tension in situ by means of a tensiometer placed between the cable and the well-logging apparatus.

A United States Pat. No. 3,497,958 to Gollwitzer describes a method for determining the depth of a well-logging apparatus using a measurement of the movement of the cable and the values for the surface and downhole tension of the cable. The Gollwitzer patent also schematically describes a device for downhole tension measurement using strain gauges.

A major problem encountered in the design of devices for measuring downhole tension is the difficulty of correctly carrying out the measurement under the temperature and pressure conditions prevailing in boreholes.

It is an object of the present invention to provide a downhole tension measurement device particularly well suited to the difficult temperature and pressure conditions encountered in boreholes.

SUMMARY OF THE INVENTION

According to the invention, a device for measuring the downhole tension applied to a cable suspending a well-logging apparatus in a borehole comprises an elongated sensitive element adapted to be connected between the cable and the well-logging apparatus to elongate elastically under the effect of tension, and a reference element fixed to a first part of the sensitive element and extending to a second part of the sensitive element. Detection means on the elements make it possible to detect the longitudinal displacement of the second part of the sensitive element with respect to the reference element under tension.

The sensitive element and the reference element are made up respectively of an elongated rod and a sleeve placed around the rod. The sleeve and rod are preferably made of the same metal so that each of them will elongate similarly as a function of temperature. The detection means comprise a transformer having a primary winding fixed on a first of the elements, preferably the rod, and a secondary winding, made up of two coils in opposition, fixed on the second element, preferably the sleeve, to generate an induced signal representative of the displacement of the sensitive element. An additional primary winding is supplied sequentially with current in order to generate a second induced signal so as to calibrate the signal representative of the displacement. The first and second induced signals are combined to generate an output signal calibrated in sensitive-element-elongation units.

The sensitive element and the reference element are placed in an oil-filled body member having compensation means for maintaining this oil at the pressure of the borehole. The device further comprises means for measuring the acceleration of the well-logging apparatus. The tension measurement signal may be combined with the acceleration signal to obtain a measurement of the friction of the well-logging apparatus against the borehole.

BRIEF DESCRIPTION OF THE DRAWINGS

The invention in its preferred embodiment is illustrated by, and may be more readily understood from, the accompanying drawings in which similar reference characters indicate corresponding parts throughout the several views in the drawing in which:

FIGS. 3A and 3B are longitudinal sections of an embodiment of the invention.

DESCRIPTION OF THE INVENTION

Figure 1:
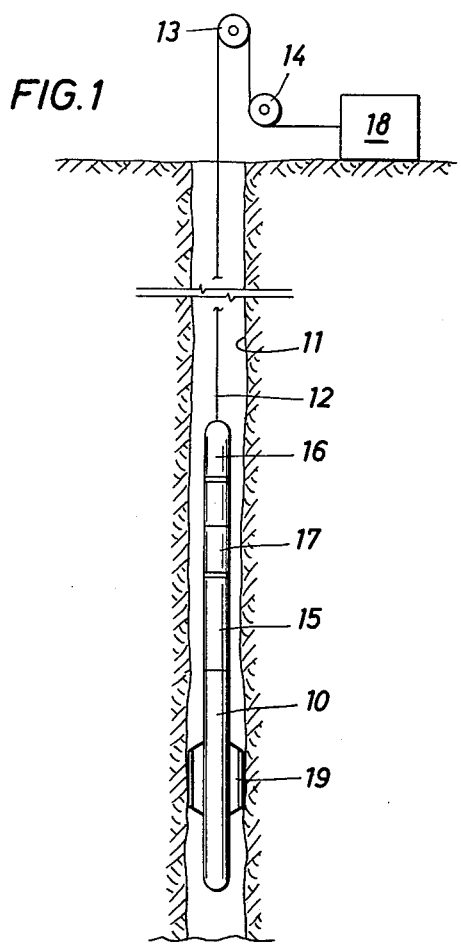
FIG. 1 is a diagram of a device according to the invention illustrated in operation in a borehole.

In FIG. 1, a well-logging apparatus 10 is suspended in a borehole 11 at the end of a multiconductor cable 12 which runs over pulleys 13 and 14 and winds on a surface winch (not shown) allowing the apparatus 10 to be moved along the borehole. The well-logging apparatus 10 which can have extensible arms 19 comprises, at its top, a transmission section 15 adapted to transmit to the surface, on the conductors of the cable 12, measurement signals detected by means of sensors of the apparatus 10. The transmission section may contain circuits of the type described in the copending U.S. application No. 872,504 and in French Pat. No. 2,379,694 published on Sept. 1, 1978 (A. Belaigues, A. Paumard and Y. Durand).

Between the well-logging apparatus 10 and a head 16 which terminates the cable 12 is inserted a device 17 according to the invention for measuring the cable downhole tension. The downhole tension may be combined with the surface tension measurement of the cable, for example, on the pulley 13, to determine the elongation of the cable 12 in the borehole. By also measuring the length of the cable unwound, it is possible with the elongation determination to determine precisely the depth of the well-logging apparatus 10 in the borehole. Surface equipment 18 receives the signals transmitted through the cable.

Figure 2:
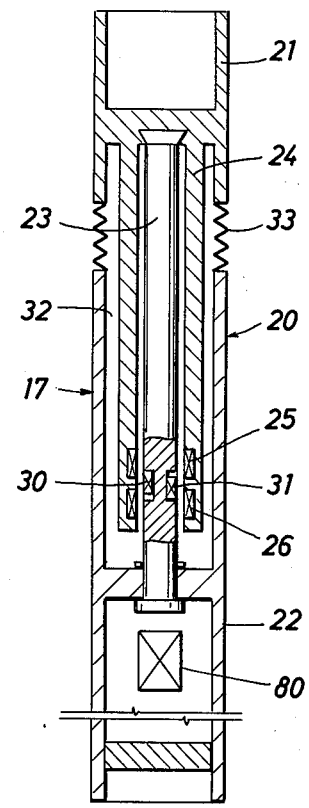
FIG. 2 is a diagram of a device showing the operating principle of the invention.

The principle of the tension measurement device 17 is shown in FIG. 2. The schematic drawing of device 17 shows a body member 20 having an upper head 21 adapted to be connected to cable head section 16 and a lower casing 22 adapted to be connected to the well-logging apparatus 10 or other apparatus such as transmission section 15. The head 21 and the casing 22 are connected to each other through a force measuring element including a rod 23 which elongates elastically under the effect of cable tension. Around the rod 23 is placed a sleeve 24 fixed to the upper part of the rod and made of the same metal so as to expand in the same manner under the effect of temperature. The sleeve 24 constitutes a reference element with respect to which is measured the elongation of the rod 23. At the lower part of the sleeve 24 and on the rod 23 are placed detection means for measuring the longitudinal displacement of the rod under cable tension.

The detection means comprise a Thomson balance type transformer having a secondary winding made up of two coils 25 and 26 connected in opposition on the sleeve 24. As will be explained in greater detail below, the transformer also includes two primary windings 30 and 31 placed on the rod 23 and supplied, individually and alternately, with alternating current. The assembly of the rod 23 and the sleeve 24 is placed in an oil-filled chamber 32 and maintained at the pressure of the well by compensation means 33 mounted on the body member 20.

The mechanical arrangement of elements of FIG. 2 makes it possible to minimize the influence of borehole pressure and temperature conditions on the device. Other sensors may be placed on the body member 20, such as, for example, a borehole mud temperature detector and a mud resistivity detector. These sensors may be connected electrically to circuits contained in the casing 22 through the oil-filled chamber 32.

The downhole tension measurement device 17 shown schematically in FIG. 2 is represented in greater detail in FIGS. 3A and 3B. Device 17 comprises an upper head 21 having a tapping 36 adapted to be screwed to the cable head 16. The head 21 includes an internal recess in which is placed a connector support 40 fixed by a key 41. On the support 40 are mounted plug-in connectors 42 to which conductors 43 are attached. The head 21 is secured to an upper body member 45 by a threaded ring 44 so as to squeeze a flange 46 projecting on the sleeve 24. At the top of the sleeve 24 is secured, by means of screws 47, a partition 50 in sealed contact on the head 21 through seals 51. The partition 50 is traversed in a sealed manner by connectors 52 connected to the conductors 43. Under the partition 50, the inside of the head 21 forms a sealed chamber 32 filled with fluid kept at the pressure of the borehole as will be seen from the discussion below. A seal 49 ensures tightness between the upper body member 45 and the head 21. A plug 53 which goes through the wall of the head 21 provides a post for filling the chamber 32.

Inside the sleeve 24 is placed the rod 23 which has a flaring upper part bearing on a conical surface of the sleeve. The rod 23 is secured at its top by a plate 56 fixed on the sleeve 24 by means of screws 57. Around the lower part of the sleeve 24 is slidably mounted a lower body member 60 on ball-type sleeves 61 and 62. The lower body member 60 can move upward with respect to the upper body member 45 because of the exitence of clearance 63 and with respect to the sleeve 24 because of the existence of clearance 64 provided over blocks 65 fixed to the sleeve by means of screws 66. Blocks 65 prevent excessive elongation of the axial rod 23 because they constitute stops when abnormal tension is exerted on the rod 23.

The lower part of the axial rod 23 is fixed, by means of a nut 70, to a jacket 71 on which are wound the two primary windings 30 and 31 slightly offset longitudinally and overlapping each other. The jacket 71 has a projecting lower flange on which is fixed the end of the lower body member 60 by means of a threaded plug 72. The lower body member 60 is thus secured to the end of the axial rod 23. The lower end of the sleeve 24 is fixed, by means of screws 73, to jacket 74 on which are wound the two coils 25 and 26 forming the secondary of the transformer. The lower part of the sleeve 24 is provided with transverse slots 75 giving it elasticity in the longitudinal direction and allowing the adjustment of the position of the jacket 74 by varying the tightening of the screws 73. The coils 25 and 26 are thus placed with respect to the winding 30 so that the output signal of the apparatus may be zeroed for a zero tension on the rod 23.

A casing 22, fixed to the lower body member 60 by a threaded ring 76, comprises an annular part 79 which projects inwardly and comes up against the lower end of the body member 60. The chamber 32 is made tight between the casing 22 and the body member 60 by a seal 77. The casing 22 contains air at atmospheric pressure and a seal 78 provides tightness between this casing and the body member 60. The connectors 82 pass sealingly through the lower part of the body member 60 and are connected toward the top either to the connectors 52 or to the windings 25, 26, 30 and 31 through conductors placed in appropriate passages. Toward the bottom, the connectors 82 are connected to various electronic circuits located inside the casing 22. This casing 22 also contains an accelerometer 80 which delivers a signal representative of the acceleration to which is subjected the casing 75 along the axis of the apparatus.

As discussed above, the space inside the body members 45 and 60 around the rod 23 and the sleeve 24 form a chamber 32 filled with fluid, oil, for example. The oil is kept at the hydrostatic pressure of the borehole by compensation means 33 consisting of a differential bellows 81 of which one end is fixed to the body member 45 and the other end to the lower body member 60. The compensation means may alternatively be a floating annular piston placed between the upper body member 45 and the lower body member 60.

The rod 23, the sleeve 24 and the jackets 71 and 74 are each made of the same non-magnetic metal so that each will expand in the same manner yet allowing detection by differential amplifier. The lower end of the casing 22 is adapted to be connected to the transmission section 15.

In operation, when tension is applied to the cable 12, the tension is transmitted to the head 21 and elastically elongates the rod 23 of tension measuring device 17 at the bottom of which is suspended the well-logging apparatus as illustrated in FIG. 1. Because of the elongation of rod 23, the lower part of the rod 23 moves downward with respect to the lower end of the sleeve 24 which carries coils 25 and 26. The transformer comprising windings 25, 26, 30 and 31 provides the means to measure the elongation of the rod 23 with respect to the sleeve 24.

Figure 4:
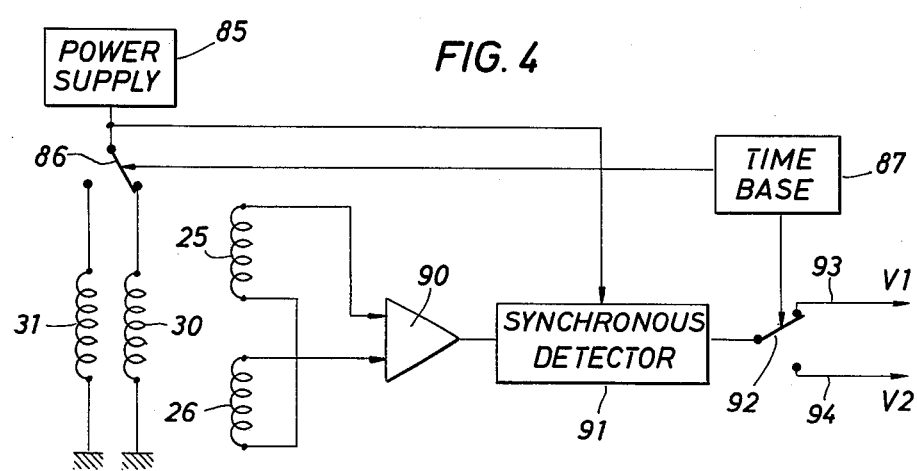
FIG. 4 is a diagram of the electrical circuits of the device of the invention.

FIG. 4 represents the measurement circuits of the transformer. A power supply circuit 85 which delivers an alternating current, for example at a frequency of 1 kHz, is connected to a switch 86 actuated by a time base circuit 87 operating for example at 300 Hz. Switch 86 is used to alternately supply current to the primary windings 30 and 31.

Windings 30 and 31, physically attached to rod 23 are slightly offset axially with respect to each other and partially overlap. The offset distance d is chosen roughly equal to the elongation experienced by the rod 23 when the maximum tension to be measured is applied to it. For example, the offset d is about 2 mm corresponding substantially to the elongation of the rod 23 for a tension of about 5600 pounds force. In practice, the two windings 30 and 31 are wound in the same groove of rod 23. The first layer is obtained by coiling 2 mm of the first winding 30, then coiling simultaneously the two windings 30 and 31, and terminating the last two millimeters with the winding 31 alone. The other layers are obtained in the same manner so as to have two offset coils which partially overlap.

Secondary coils 25 and 26 are connected in opposition at the input of a differential amplifier 90, the output of which is applied to a synchronous detector 91 having the power supply 85 as a reference. The rectified output signal from the synchronous detector 91 is applied to a switch 92 controlled by the time base 87. The switch 92 is thus controlled so that the output signal V1 on a lead 93 corresponds to a signal induced by the primary winding 30 and the output signal V2 appearing on lead 94 corresponds to a signal induced by the winding 31.

As discussed above, the position of jacket 74 may be adjusted mechanically so that the signal V1 is zero when the tension applied to the rod 23 is zero. The difference between signals V1 and V2 when there is no tension on rod 23 corresponds to an elongation equal to the offset distance d between the two windings 30 and 31. The signals V1 and V2 are transmitted to the surface via the transmission circuits contained in the section 15 and the conductors of the cable 12 to the surface equipment 18. The surface equipment processes the signals V1 and V2 to generate an output signal v according to the equations:

$$v = V1 \cdot d / (V2 - V1)$$

Generating the signal v according to the above equation eliminates the error or drift signals introduced into the circuits by temperature variations. The signal v is thus calibrated in units of elongation of the rod 23 and is representative of the tension applied to the cable because it is approximately linearly proportional to the elongation of the rod 23. The signal generated by accelerometer 80 is also transmitted to the surface equipment by means of the transmission circuits contained in the section 15. The downhole tension and logging apparatus acceleration signals are displayed and may be recorded by the surface equipment 18.

In a preferred embodiment, the tension and acceleration signals are processed to determine a friction force signal proportional to the friction force between the logging apparatus 10 and the wall of the borehole. If T designates the cable downhole tension, Pa the apparent weight of the well-logging apparatus, Fr the friction of the logging apparatus against the borehole wall, M the weight of the logging apparatus and $\gamma$ the acceleration of the logging apparatus, the basic equation of dynamics gives the following equation:

$$T - Pa - Fr = M \cdot \gamma$$

The apparent weight Pa of the sonde can be very easily determined before the apparatus is lowered into the borehole knowing the density of the mud. The friction force Fr between the logging apparatus and the borehole wall may be determined either by means of specific calculation circuits or by means of a suitably programmed commercially available computer associated with the surface equipment.

It is to be understood that the invention is not limited to the exact details of construction, operation, or exact materials or embodiments shown and described as obvious modifications and equivalents will be apparent to one skilled in the art, and the invention is therefore to be limited only by the scope of the appended claims.

What is claimed is:

1. Apparatus for measuring the downhole tension applied to a cable suspending a well-logging apparatus in a borehole, comprising:
   (a) an elongated sensitive element adapted to be connected between the cable and the well-logging apparatus to elongate elastically under the effect of the downhole tension;
   (b) a reference element fixed to a first portion of said sensitive element and extending along said sensitive element to a second portion of said sensitive element;
   (c) a fluid-filled body member adapted to receive said sensitive element and said reference element and compensation means on said body member to maintain the fluid at the pressure of the borehole; and
   (d) detection means on said reference element and said sensitive element for detecting longitudinal displacements of said second portion of said sensitive element relative to said reference element under the effect of the downhole tension to generate an output signal representative of the downhole tension.

2. Apparatus of claim 1 characterized in that said reference element is designed for elongating at the same rate as the sensitive element as a function of temperature.

3. Apparatus of claim 1 further comprising acceleration measurement means for generating a signal representative of the acceleration of the well-logging apparatus.

4. Apparatus of claim 3 further comprising means for combining the signal representative of the cable tension and the signal representative of the acceleration of the well-logging apparatus to generate a signal representative of the friction of the well-logging apparatus against the borehole.

5. Apparatus for measuring the downhole tension applied to a cable suspending a well-logging apparatus in a borehole, comprising:
   (a) an elongated rod adapted to be connected between the cable and the well-logging apparatus to elongate elastically under the effect of the downhole tension;
   (b) a sleeve arranged around the rod and fixed to one end of the rod, the sleeve extending along the rod to a lower portion of the rod;
   (c) a fluid-filled body member adapted to enclose said rod and sleeve and compensation means on said body member to maintain the fluid at the pressure of the borehole; and
   (d) a transformer having its primary winding fixed to the rod and adapted to be supplied with current and a secondary winding fixed to the sleeve to generate an induced signal representative of the displacement of the rod.

6. The apparatus of claim 5 characterized in that the rod and the sleeve are made of the same metal.

7. The apparatus of claim 5 further comprising an additional primary winding fixed to the rod in order to generate a second induced signal to calibrate the signal representative of the displacement.

8. The apparatus of claim 7 wherein said additional winding is fixed to the rod at a given distance from the primary winding, and further comprising means for alternately supplying current to the primary winding and the additional primary winding in order to alternately induce first and second induced signals in the secondary winding.

9. Apparatus according to one of the claims of 7 or 8 further comprising means for combining said first and second induced signals to generate an output signal calibrated in sensitive-element-elongation units.

* * * * *